(12) United States Patent
Chin et al.

(10) Patent No.: US 7,072,972 B2
(45) Date of Patent: Jul. 4, 2006

(54) METHOD AND APPARATUS FOR PERFORMING USER MIGRATION WITHIN A VIDEO ON DEMAND ENVIRONMENT

(75) Inventors: Danny Chin, Princeton Junction, NJ (US); Clement G. Taylor, Watertown, MA (US); Jesse S. Lerman, Kendall Park, NJ (US)

(73) Assignee: Sedna Patent Services, LLC, Philadelphia, PA (US)

( * ) Notice: Subject to any disclaimer, the term of this patent is extended or adjusted under 35 U.S.C. 154(b) by 876 days.

(21) Appl. No.: 09/733,808

(22) Filed: Dec. 8, 2000

(65) Prior Publication Data

US 2003/0035419 A1 Feb. 20, 2003

Related U.S. Application Data

(60) Provisional application No. 60/170,439, filed on Dec. 10, 1999.

(51) Int. Cl.
*G06F 15/16* (2006.01)
(52) U.S. Cl. ............... 709/231; 709/203; 709/219; 709/227; 709/232
(58) Field of Classification Search ............... 709/203, 709/217, 219, 226, 230, 231, 232
See application file for complete search history.

(56) References Cited

U.S. PATENT DOCUMENTS

| | | | |
|---|---|---|---|
| 5,579,527 A | 11/1996 | Chin et al. ............... 395/800 |
| 5,592,612 A | 1/1997 | Birk .................... 395/182.04 |
| 5,630,067 A | 5/1997 | Kindell et al. ........ 395/200.09 |
| 5,649,093 A | 7/1997 | Hanko et al. .......... 395/182.04 |
| 5,671,377 A | 9/1997 | Bleidt et al. ............. 395/328 |
| 5,699,503 A | 12/1997 | Bolosky et al. ....... 395/182.04 |
| 5,862,312 A | 1/1999 | Mann et al. |
| 5,923,891 A | 7/1999 | Armstrong ............ 395/800.16 |
| 5,987,621 A | 11/1999 | Duso et al. ................ 714/4 |
| 5,996,015 A | 11/1999 | Day et al. ................ 709/226 |
| 6,115,740 A * | 9/2000 | Mizutani ................. 709/217 |
| 6,195,680 B1 * | 2/2001 | Goldszmidt et al. ...... 709/203 |
| 6,377,996 B1 * | 4/2002 | Lumelsky et al. ........ 709/231 |

FOREIGN PATENT DOCUMENTS

GB 2 299 424 A 10/1966

OTHER PUBLICATIONS

Narendran B et al: "Data distribution algorithms for load balanced fault-tolerant Web access" Reliable Distributed Systems, 1997. Proceeings., The Sixteenth Symposium on Durham NC, USA Oct. 22-24, 1997, Los Alamitos, CA, USA, IEEE Comput. Soc. US, Oct. 22, 1997, pp. 97-106, XP010254988 ISBN: 0-8186-8177-2 pp. 103-105, 4: "Fault-tolerance and Graceful Degradation of Performance".
Supplementary European Search Report in corresponding EP 00 98 2537.

* cited by examiner

*Primary Examiner*—Rupal Dharia
*Assistant Examiner*—Quang N. Nguyen
(74) *Attorney, Agent, or Firm*—Patterson & Sheridan, LLP

(57) ABSTRACT

A method and apparatus for migrating one or more users from a source server module to a destination server module in a manner avoiding information discontinuities or otherwise degrading the users' viewing experience.

17 Claims, 6 Drawing Sheets

METHOD AND APPARATUS FOR PERFORMING USER MIGRATION WITHIN A VIDEO ON DEMAND ENVIRONMENT

CROSS REFERENCE

This application claims benefit of U.S. Provisional Application Ser. No. 60/170,439, filed Dec. 10, 1999, which is hereby incorporated by reference in its entirety.

BACKGROUND OF THE INVENTION

1. Field of the Invention

The present invention relates to an information distribution system such as a video-on-demand (VOD) system. More particularly, the present invention relates to a method and apparatus for migrating users between information server modules in a manner minimizing disruption of content streams being provided to the user.

2. Description of the Background Art

VOD systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

The most important characteristic of a video on demand system is the experience of a user receiving content via that system. That is, a user ideally selects desired content and the system provides the desired content to the user in a timely manner and at a quality level consistent with the user's expectations. Failure to meet the user expectations in terms of image quality, sound quality, system latency or other factors results in a less than satisfying experience to the user. Unfortunately, video demand systems and other systems are subject to periodic operational anomalies such that a user experience may be adversely impacted. For example, in the case of a user receiving a content stream such as a movie or television program via a server, an operational anomaly occurring within the server or within apparatus supporting the server may result in the cessation of the content stream to the user. This is, obviously, a very undesirable condition.

SUMMARY OF THE INVENTION

The disadvantages heretofore associated with the prior art are overcome by the present invention of a method and apparatus for migrating one or more users from a source server module to a destination server module in a manner avoiding information discontinuities or otherwise degrading the users' viewing experience.

In the case of a video on demand system utilizing a plurality of servers to provide content to users, it is desirable to sense anomalous conditions or other errors within a server presently providing content to a user and, upon determination that an error exists (or that a load imbalance condition exists), migrating that user to a server not affected by the error or load imbalance condition. It is desirable to perform migration in a manner minimizing disruption of content streams being provided to the user.

A method according to an embodiment of the invention and for migrating a user from a source server module to a destination server module, each of the server modules including common content stored as respective sequences of extents, where each extent represents a predefined portion of the common content, the method comprising the steps of determining, for a content stream presently being provided to the user via the source server, a transitional extent; determining if the destination server module is capable of providing the transitional extent within a first time period; and providing, to the user via the destination server module, the transitional extent and subsequent extents associated with the content stream.

An apparatus according to the present invention comprises a plurality of server modules, each of the server modules having associated with it a respective mass storage device, the mass storage devices including at least common content stored as respective sequences of extents, where each extent represents a predefined portion of the common content; a switch, for coupling content streams provided by the server modules to appropriate respective transport processors, each of the transport processors providing a respective transport stream to a network; wherein in the case of a server module failure, content streams provided by the failing server module are migrated to a non-failing server module such that subscribers receiving the content streams receive substantially uninterrupted service.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
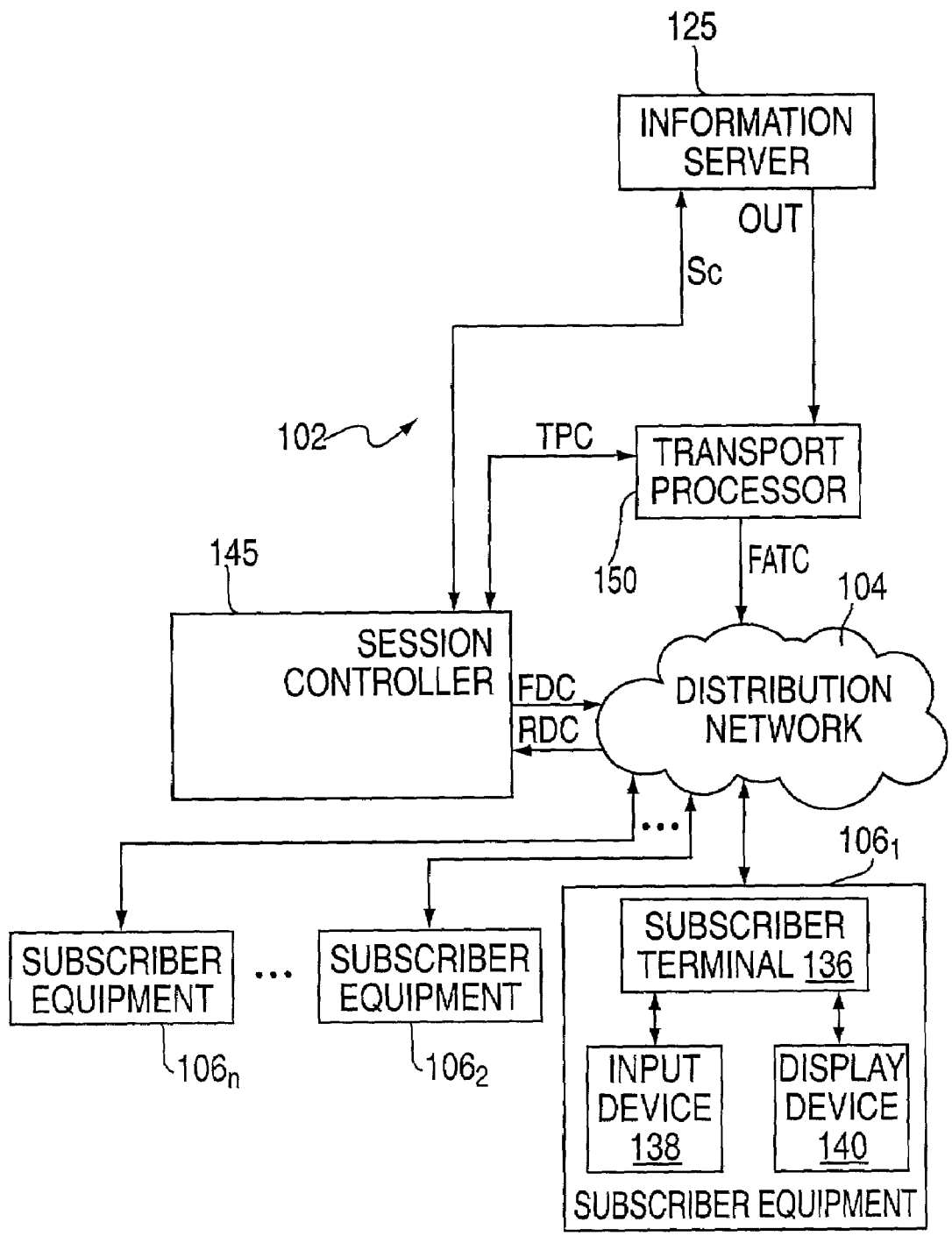
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications network 104 and subscriber equipment 106$_n$, where n is an integer greater than zero.

The service provider equipment 102 comprises an information server 125, a session controller 145 and a transport processor 150. Briefly, the session controller 145, in response to a request(s) from subscriber equipment 106, causes the requested content to be retrieved from the information server 125 and provided to the transport processor 150. The transport processor 150 combines or multiplexes the retrieved content to provide an output data stream for the requesting subscriber(s). The output data stream is conditioned for transport to the requested subscriber via a forward application transport channel (FATC) within the distribution network 104.

The information server 125 is used to store content such as movies, television programs and other information offerings of the interactive information distribution system 100 of FIG. 1. Additionally, the information server 125 is used to store assets such as bit map imagery, graphic overlay, control scripts and the like. The assets may comprise, for example, navigation assets that are used by a set top terminal to interactively navigate, and select for viewing, the offerings or content available from the service provider equipment 102. The information server 125, in response to a control SC produced by the session controller 145, provides content and/or asset data to the transport processor 150. The content and asset storage module will be described in more detail below with respect to FIG. 2.

The session controller 145 provides session control of the information flowing to and from the information server 125, and may be generally described as a system providing or controlling communications between, for example, a cable system head-end and one or more set top terminals 136 The session controller 145 produces the storage control signal SC for controlling and communicating with the information server 125, and a transport processor control signal TPC for controlling and communicating with the transport processor 150. In response to a user request for particular content, the session controller 145 causes the requested content file and to be streamed from the information server 125 to the transport processor 150.

The session controller 145 sends data, such as commands, encryption keys and the like, to set top terminals via a forward data channel (FDC). The session controller 145 receives data, such as information stream requests and session initiation data (set top identification, capability and the like) via a reverse data channel (RDC). The FDC and RDC are supported by the distribution network 104 and comprise relatively low bandwidth data channels, such as one-two megabits per second data channels utilizing QPSK, QAM, or other modulation techniques. The FDC and RDC are also known as "out-of-band" channels, while the relatively high bandwidth forward application transport channel (FATC) is also known as an "in-band" channel. The session controller 145 contains an interface device for sending control information via the forward data channel FDC and receiving control information and request information via the reverse data channel RDC using the so-called "out-of-band" carrier frequencies.

The transport processor 150 accomplishes all of the forward content channel transmission interface requirements of the system 100 of FIG. 1. Specifically, the transport processor 150 is coupled to subscriber equipment via the forward applications transport channel (FATC). That is, the transport processor 150 is capable of providing a plurality of scrambled or unscrambled content and/or asset streams modulated onto various carrier frequencies suitable for use in the distribution network 104. The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal via the FDC may be included in the FATC data stream. The transport processor 150 also contains a modulator for modulating the combined content and asset stream onto one or more carrier frequencies for transmission on the FATC, the so-called "in-band" carrier frequencies.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal 136 receives the data streams from the FATC, demodulates the received data streams and, in the case of video streams, processes the demodulated video streams for subsequent display on the display device 140. In addition, the set top terminal 136 accepts commands from the remote control input device 138 or other input device. These commands are formatted, modulated, and transmitted through the distribution network 104 to the session controller 145. Typically, this transmission is accomplished through the reverse data channel RDC. These commands are preferably transmitted through the same network used to transmit information to the set top terminal. However, the RDC coupling the set top terminal to the provider equipment 102 may be a separate network, e.g. a FATC through a television cable network and an RDC through a telephone network. The telephone network could also support the FDC.

Figure 2:
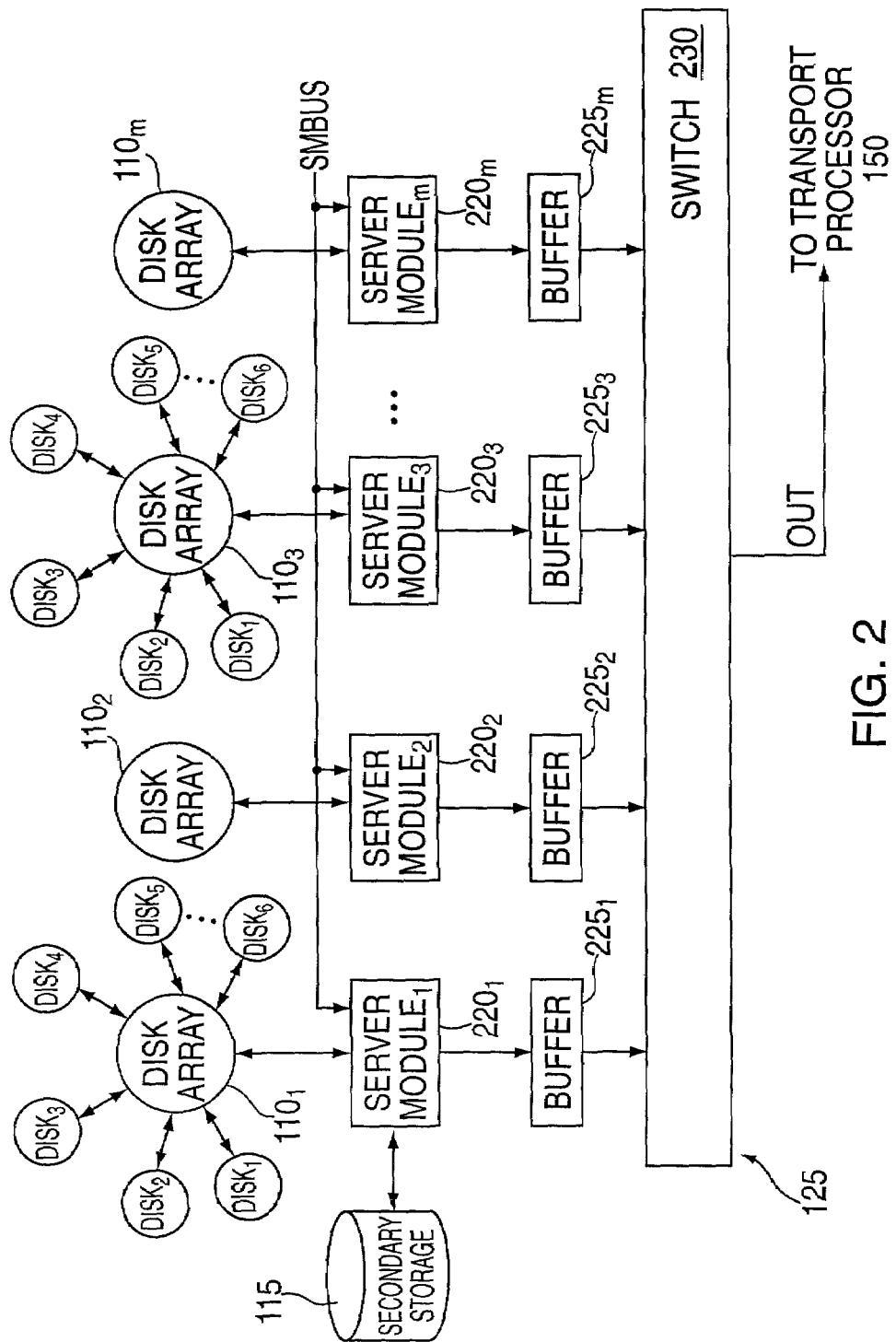
FIG. 2 depicts a block diagram of an information server suitable for use in the interactive information distribution system of FIG. 1.

FIG. 2 depicts a block diagram of a content and asset storage module suitable for use in the interactive information distribution system 100 of FIG. 1. Specifically, the information server 125 of FIG. 2 comprises a plurality of server modules $220_1$–$220_m$, where m is an integer (collectively server modules 220). Each of the server modules 220 is coupled to a respective disk array 110. Each of the respective disk arrays 110 comprises a plurality of disks, such as optical or magnetic storage disks capable of providing an appropriately high throughput. It will be noted in FIG. 2 that the first disk array $110_1$, which is coupled to the first server module ($220_1$) comprises a plurality of disks denoted as $DISK_1$ through $DISK_i$, where i is an integer. Similarly, disk array $110_3$, which is coupled to server module $220_3$ comprises a plurality of disks denoted as disk 1 through disk I. To simplify FIG. 2, disks forming the disk arrays $110_2$, $110_4$ and $110_m$ of the remaining server modules 2 and 4 through m are not shown. It will be appreciated by those skilled in the art that each server module 220 may be associated with more than one disk array 110.

An information server 125 suitable for use in the present invention is described by Chin et al. in U.S. Pat. No. 5,579,527 and incorporated herein by reference in its entirety. A system for supplying streams to multiple users suitable for use in the present invention is described by Bleidt et al. in U.S. Pat. No. 5,671,377 and incorporated herein by reference in its entirety. It must be noted that while the invention may advantageously utilize a massively parallel storage, retrieval and distribution system, the invention does not require the use of such a system. Rather, the invention is well suited to any storage arrangement in which the user is receiving data from a plurality of server modules storing similar data are migrated between the server modules. A method and apparatus for minimizing disk drive access time in. e.g., a disk drive array and suitable for use in the present invention is described by Armstrong in commonly assigned U.S. Pat. No. 5,923,891, which is incorporated herein by reference in its entirety.

Each server module 220 (within the information server 125) includes a respective buffer. Each buffer memory is capable of holding at least one service period (i.e., one extent) worth of information retrieved from a disk array 110 via the respective server module 220. Each buffer 225 is coupled to a switch 230.

The switch 230 operates to multiplex the contents of each buffer 225 in a round robin fashion to produce an output stream OUT that is coupled to the transport processor 150 for subsequent transport to the appropriate subscribers 106 via the forward application transport channel (FATC) supported by the distribution network 140. The exemplary embodiment uses a service period of two seconds. Thus, each extent retrieved from a single disk within a disk array 210 comprises two seconds worth of information, illustratively, video information and associated audio information. Thus, in the case of 30 frames per second video, each buffer 225 must hold at least 30 frames of video and any associated audio information. The output stream OUT is modulated by modulation circuitry within the transport processor 150 and transmitted to the appropriate subscribers.

Each server module 220 is capable of providing information to a plurality of users 106. Thus, each server module buffer 225 associated with a server module 220 is capable of holding at least one extent of data for each of the plurality of subscribers 106 serviced by that server module 220. For example, if the first server module ($220_1$) is capable of serving 100 subscribers, then the buffer $225_1$ associated with the first server module $220_1$ must be capable of holding at least 200 seconds worth of information, illustratively video information and any associated audio information.

Under normal operating circumstances, each server module 220 retrieves information from its respective disk array for each subscriber 106 supported, and transfers the retrieved information to the respective buffer (or buffer region) 225. The switch 230 receives packets from the buffers $225_1$ to $225_m$. The switch 230 comprises, illustratively, a non-blocking switch having a channel capacity of approximately 1 GBPS and serving a plurality of channels or ports.

In the case of a server module failure, a primary or secondary storage failure such as a disk array failure, a buffer failure, or some other event (e.g., such as preserving a balance in user load between servers) affecting the flow of information to subscribers via one of the server modules 220, the users on the affected server module 220 must be migrated to another server module. The affected server module 220 is considered the "source server module," while the server module that receives the migrated user is considered the "destination server module." Thus, within the context of this description, a "source server module" is a server module from which a user is migrated, while a "destination server module" is a server module to which the user is migrated. Since the information server 125 comprises a plurality of server modules 220, the loss of one or more server modules 220 may be compensated for by migrating some or all of the users from the damaged server module(s) to the remaining, functional server modules. In this manner, component failures within the information server 125 will result in a degradation of information server performance that, ideally, will not adversely impact the experience of users receiving content streams within the information distribution system 100 of FIG. 1.

In addition to the migration of users based upon server module failure, in one embodiment users are migrated to achieve load balancing between the various server modules. That is, in the case of any particular server module becoming over utilized (i.e., having a disk access, memory bandwidth or other parameter being utilized beyond a threshold level), one or more users from the over utilized server module are migrated to other server modules. In this manner, each server module may be operated at an appropriate level of utilization.

Ideally, the migration of users between server modules is accomplished in a manner invisible to the users, i.e., without causing visual or aural artifacts on the affected users' presentation devices. The invention advantageously provides user migration in a manner tending to avoid such visual or aural artifacts.

To accomplish such an artifact-free migration of users between server modules 220, the server modules 220 communicate with each other via a server module bus SMBUS to determine if such a migration is possible given the time constraints of the extents to be streamed, such a migration is possible given the content available on other server modules or such a migration is possible due to other reasons.

Figure 3:
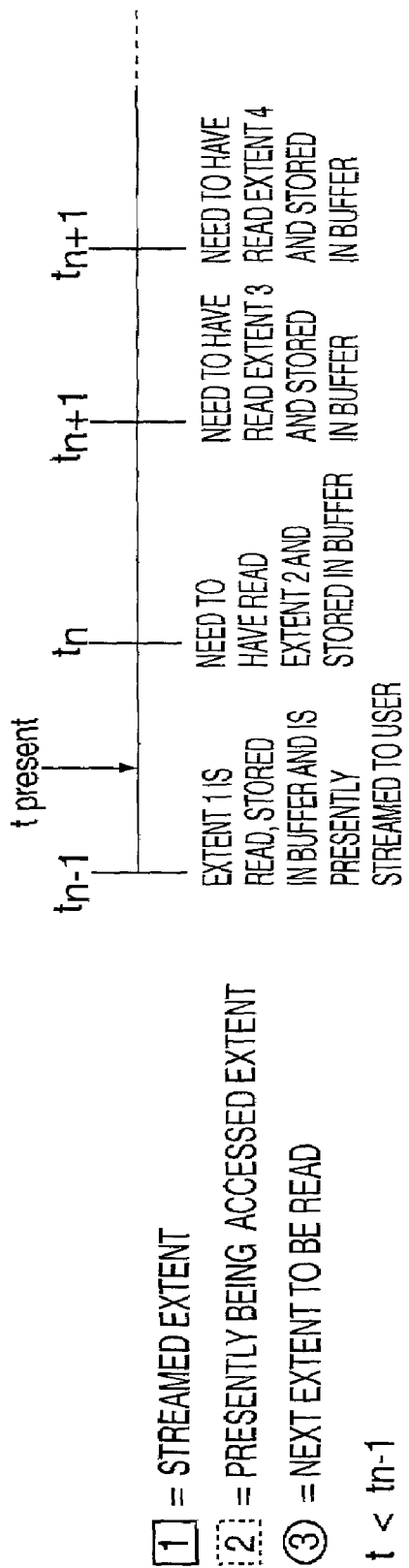
FIGS. 3A and 3B depict graphical diagrams useful in understanding the present invention.

FIGS. 3A and 3B depict graphical diagrams useful in understanding the present invention. FIG. 3A depicts a graphical representation of extent storage useful in understanding the invention. Specifically, FIG. 3A depicts a tabular representation of the disk number 320 and extent number 330 for the disk arrays associated with each of a source and destination server module 310.

Referring to FIG. 3A, a first or source server module (illustratively server module $220_1$ of the information server 125 of FIG. 2) comprises six disk drives, labeled 0–5. The content is distributed, on an extent by extent basis, across the available disk drives. It is seen that a first extent of a content stream, denoted as extent 0, is stored on disk drive 1. The second extent is stored on disk drive 2, the third extent is stored on disk drive 3, the fourth extent is stored on disk drive 4, and the fifth extent is stored on disk drive 5. The sixth extent is stored on disk drive 0, the seventh extent is stored on disk drive 1 and so on. Similarly, a disk array 110 associated with a destination server module (illustratively server module $220_3$ of FIG. 2) includes the same respective extents stored on the same respective disks and in the same respective order. It will be appreciated by those skilled in the art that it is not necessary to store the extents on corresponding disk drives within the respective disk drive arrays serving the source and destination server modules. All that is important is that each extent may be located within the disk drive array and accessed in a timely manner to effect a smooth, if not seamless, migration of a user from the source server module $220_1$ to the destination server module $220_3$.

In one embodiment of the invention, the source server uses a different extent size than the destination server. So in this case rather than sending the extent number, an MPEG packet offset is sent. That is, the source server provides to the destination server a parameter indicative of an offset into a particular extent. The offset may be defined in terms of, for example, packet number, time or other parameters. Based on the provided offset, the destination server knows which particular extent to examine and, within the examined extent, which portion of that extent should be retrieved.

Thus, an offset defined in terms of packet number (or number of packets) causes the destination server to index into the identified extent by the packet number (or number of packets) and identify the remaining portion of the extent as the start of a stream to be subsequently provided to the migrated user. In this manner, transitions may occur anywhere within an extent, rather than at the extent boundaries alone.

FIG. 3B depicts a graphical representation useful in understanding the timing constraints imposed upon the source and destination server modules during the migration of a user at a transitional extent. Referring to FIG. 3A, the second extent of a content stream being provided to a user is stored on disk 2 and is denoted as extent 1 and surrounded by a solid box. For purposes of this discussion, it is assumed that the second extent is the presently streamed extent provided by the source server module to the user. Similarly, the third extent is denoted as extent 2 and is surrounded by a dashed-lined box. The third extent is the presently accessed extent; that is, the extent that the disk array is presently retrieving and providing to the server module. The first extent (i.e., the streamed extent) is stored in the buffer 225 or has been provided to the transport processor 150 in its entirety. The next extent is the fourth extent, which is stored on disk 3 and denoted by a circle.

Referring to the time bar in FIG. 3B, at a time $T_{n-1}$, extent 1 is read and is stored in the buffer 225 or in the transport processor 150 and is presently being streamed to the user. At a time $T_n$, the presently being accessed extent (the dash boxed third extent denoted by the number 2) must have been read and stored in the buffer. At a time $T_{n+1}$, the fourth extent, that is the extent circled and denoted by the number 3, must have been read from the disk array and stored in the buffer. Assuming that a present time $T_{present}$ lies between $T_{n-1}$ and $T_n$, the source server module may determine that the transition extent should be the extent stored on disk drive 4. Thus, the destination server module must begin reading the fourth extent (i.e., the extent stored on disk 4 of the disk array associated with the destination server module) and have this fourth extent available for storage in the output buffer associated with the destination storage module before the deadline of $T_{n+1}$. The transitional extent may comprise the second extent sequentially following the current extent. The transitional extent may also comprise the extent sequentially following the first full extent following the current extent.

It should be noted that in some cases it is unlikely that a user will be migrated without suffering a degradation in the viewing experience. As such, in these instances it is unnecessary to utilize system resources in effecting such a seamless migration. For example, in the case of a user receiving a stream from a disk array including a disk that has failed, the user stream may have already been interrupted. As such, there is no need to seamlessly migrate such a user and, in fact, it is better to quickly migrate such a user irrespective of visual artifacts, since this user may already be experiencing a degraded presentation.

In one embodiment of the invention, prior to user migration a determination is made as to whether a user to be migrated is presently experiencing a high level of degradation or failure, or if the user is likely to experience a high level of degradation prior to the time in which a migration may be effected. For example, in the case of a user receiving an extent from a first disk within a disk array where a tenth disk within the array has failed, if the user is migrated prior to receiving information from the tenth disk, then such migration may be effected in a relatively seamless manner. However, if the next extent to be provided to the user is stored on the failed disk, then it is unlikely for that user to be successfully migrated in a seamless manner. In this instance, the user is migrated in a direct manner, irrespective of degradation to the user experience.

Thus, in this embodiment of the invention, priority is given to those users who may be successfully migrated in a seamless manner such that at least some users may avoid a degradation in service. For those users who have already experienced, or will likely experience, such a degradation in service, migration is effected in a direct and likely non-seamless manner. In this manner, system resources are preserved while preferential treatment is given to those users capable of receiving a seamless migration.

It will be appreciated that in the case of user migrations predicated upon load balancing considerations, such migrations may typically all be accomplished in a seamless manner. Thus, the above description pertains primarily to the situation where a failure has occurred or is likely to occur shortly.

In one embodiment of the invention, streams are transitioned at the extent whose MPEG transport stream boundary packet has an adaptation field with the random access indicator set and with a PCR. At that transition point, the destination server will set the discontinuity indicator bit when starting up the migrated stream. This will allow for correction of any jitter due to a lack of synchronization between the source and destination servers. If the source and destination servers are not synchronized, then the first packet of the migrated stream may be sent slightly early or slightly late by the destination server module. It is noted that in this embodiment transitions occur not at extent boundaries but at defined points within extents. This additional flexibility allows for rapid processing of user migration steps which are discussed in more detail below with respect to FIGS. 4–6, since the amount of time wasted waiting for a transitional point is reduced.

Figure 4:
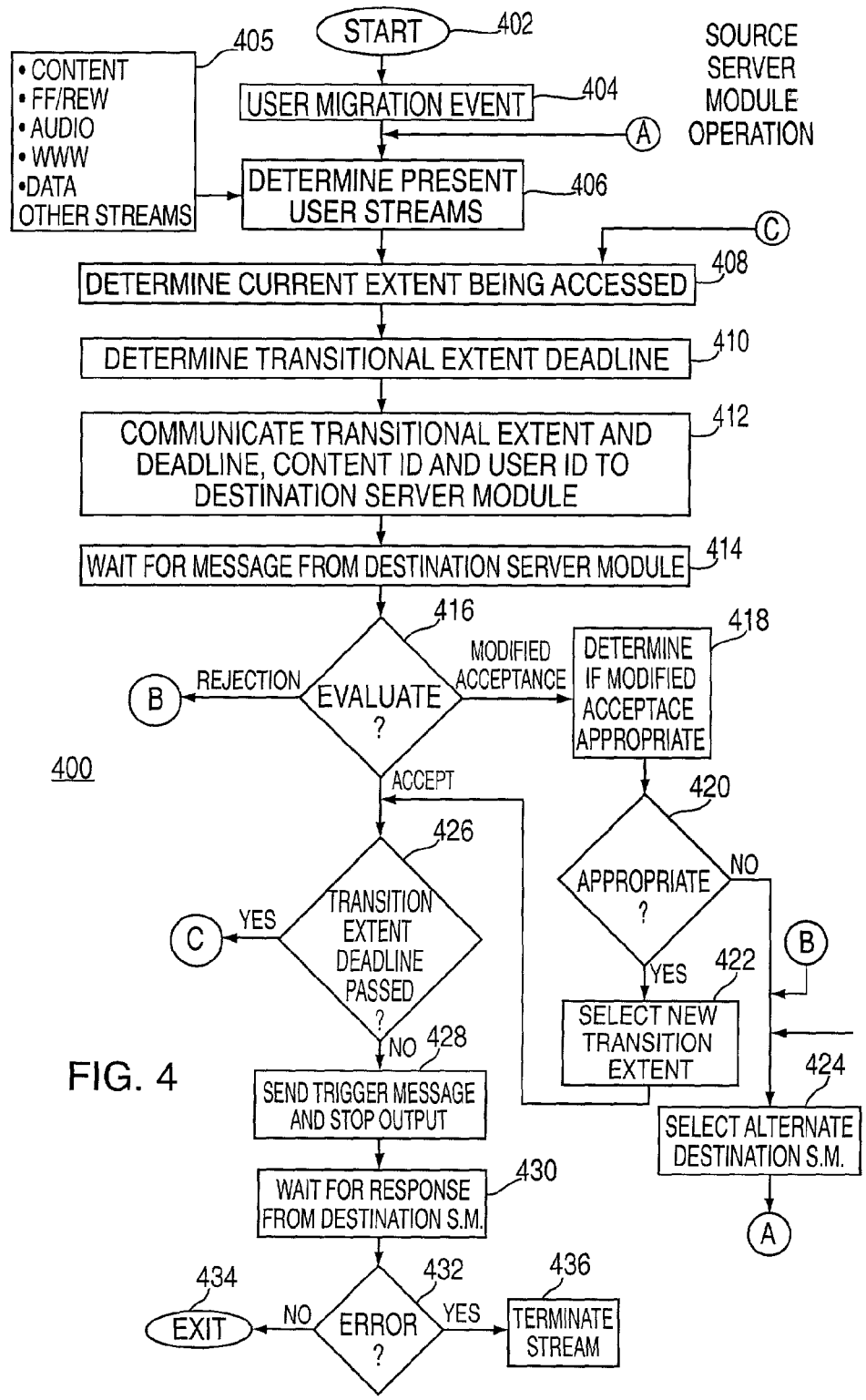
FIG. 4 depicts a flow diagram of a source server module user migration method suitable for use in the information server module of FIG. 2.

FIG. 4 depicts a flow diagram of a source server module operation method. Specifically, FIG. 4 depicts a flow diagram of a method suitable for use in a server module presently streaming content to a user that must be migrated to a destination server module. The operation of the source server module will be discussed in conjunction with FIG. 2, in which a first server module 220₁ migrates users to a third server module 220₃.

The method 400 is entered at step 402 and proceeds to step 404, where a user migration event occurs. Such a user migration event (or a server load imbalance event) may comprise, illustratively, an excessive utilization of memory bandwidth, link bandwidth or output bandwidth, an error in one of the disk drives forming the disk array 110₁, an error in a secondary storage device 115, or any other condition likely to result in a degradation to the streams provided to the users of the server module 220₁. It is noted that a server load imbalance may not be triggered by any particular event but, rather, may comprise a periodic observation of the relative loading of the various servers within the system such that when the loading of one or more servers becomes relatively high or low as compared to the other servers within the system, users are migrated in a manner tending to even the load of each of the servers within the system. This can be useful to prevent unnecessary bottlenecks when accessing content that may only exist on a subset of the server modules within the system. Upon sensing or determining that a user migration event has occurred, the method 400 proceeds to step 406.

At step 406, the present user stream or streams is determined for each user being supported by the source server module. That is, referring to box 405, user streams such as content streams, fast forward/rewind streams, audio streams, data streams and other streams presently used to satisfy user requests are determined for at least those users of the server module experiencing a migration or load balancing event. The method 400 then proceeds to step 408.

At step 408, the current extent being accessed for each of the user streams is determined. That is, in the case of a user stream such as a content stream that is stored on a disk array 110 as a sequence of extents distributed on disks ($DISK_1$ through $DISK_J$) within the disk array, the extent presently being accessed by the disk array controller or server module 220 is determined. The method 400 then proceeds to step 410.

At step 410, a transitional extent deadline is determined. That is, at step 410 an extent temporally following the presently accessed extent is defined as the transitional extent. The transitional extent is the first extent to be streamed to the user by the destination server module during a user migration. Thus, the transition extent is selected such that sufficient time between the present time and the transitional extent deadline is provided to allow such a transition to occur. However, depending upon the nature of the user migration event, that time may be required to be very short to avoid significant degradation or, in fact, termination of user streams. Thus, where a user migration event threatens to disrupt user streams in the very near future, the transition extent is preferably selected to be the extent as soon after the presently accessed extent which will likely allow sufficient time to effect a successful user migration to the destination server module. (Alternatively, the transition extent is selected the nearest to one that avoids a loss of content experience by the user.) The method 400 then proceeds to step 412.

At step 412, the source server module (illustratively, server module $220_1$) communicates the transitional extent and its deadline, the content identification of the user stream or streams to be migrated, and the user identification of the user to be migrated to the destination server module (illustratively, server module $220_3$). The method 400 then proceeds to step 414.

At step 414, the method 400 waits for a message to be received from the destination server module. That is, having communicated the appropriate information defining the parameters of the user migration required, the source server module waits for a message from the destination server module indicating whether or not that server module can accommodate the user migration. The method 400 then proceeds to step 416.

At step 416, a message received from the destination server module is evaluated to determine if the destination server module has accepted the migration request, rejected the migration request, or accepted the migration request with modifications. If the migration request has been rejected, then the method 400 proceeds to step 424, where an alternate destination server module is selected. If the migration request has been accepted, then the method 400 proceeds to step 426. If the migration request has been accepted with modifications, then the method 400 proceeds to step 418.

At step 426, a determination is made as to whether the transition extent deadline has passed. That is, a determination is made as to whether, during the time required to process the various messages between the determination of the transitional extent deadline at step 410 and the query at step 426, has the deadline determined at 410 been missed such that a new transition extent should be determined. If the query at step 426 is answered affirmatively (i.e., the transition extent deadline has been missed), then the method 400 proceeds to step 408, where the current extent being accessed is determined and to step 410, where a new transitional extent deadline is determined. If the transition extent deadline has not passed, then the method 400 proceeds to step 428, where output is stopped at the appropriate location and a trigger message is sent to the destination server module (illustratively, server module $220_3$ of FIG. 2). The method 400 then proceeds to step 430, where the method waits for a response from the destination server module. Upon receiving a response to the trigger message, the method 400 proceeds to step 432.

At step 432, a query is made as to whether an error condition is indicated by the destination server module response. If no error is indicated, this means that the destination server module has successfully accessed the transition extent prior to the transition extent deadline and that the accessed transition extent has been stored in the output buffer of the destination server module. In the case of no error, the method 400 proceeds to step 434 where it is exited. As part of the exiting of the method in the case of successful user migration, any resources allocated to supporting a user that has been migrated may be released for other users. Similarly, the method 400 may be reentered to migrate the next user within the current group of users being serviced by the source server module. In the case of reentry to migrate another user, the method 400 is entered at either step 404 (where a user migration event occurs) or at step 406 (where the present user stream or streams is determined).

In the case of the query at step 432 indicating that an error condition exists, the method 400 proceeds to step 436 where the stream is terminated. In this manner, the scenario where both the source server module and destination server module are simultaneously trying to send streams to the user is avoided. In such a scenario, packet collisions will occur causing a degradation in presentation quality due to the loss of video information associated with at least the packets lost to collisions.

If the query at step 416 indicates that a modified acceptance to the user migration request message sent at step 412 has been received, then the method 400 proceeds from step 416 to step 418. At step 418, a determination is made as to whether the modified acceptance is appropriate given the conditions of the user migration event and the streams provided to the user. A modified acceptance typically comprises an acceptance of the user to be migrated by the destination server module, modified in the sense that the destination server module has determined that a different transitional extent and therefore a different transitional extent deadline may be supported. That is, the destination server module has determined that the transitional extent and transitional extent deadline determined at step 410 is not feasible for some reason (e.g., bandwidth congestion), but that the destination server module can receive the migrated user at a later time. The later time is communicated to the source server module as a proposed transitional extent deadline and identifier. The method 400 then proceeds to step 420.

At step 420, a query is made as to whether the determination at step 418 indicated that the modified acceptance was appropriate. If the modified acceptance is determined to be appropriate, then the method 400 proceeds to step 422. If the modified acceptance is determined to be inappropriate, then the method 400 proceeds to step 424.

At step 424, an alternative destination server module is selected. That is, since the initially selected destination server module is unable or incapable of receiving a migrated user within a time frame determined to be appropriate, a new destination server module 220 within the information server 125 is selected. The method 400 then proceeds to step 406, where the present user streams are determined for the user to be migrated.

At step 422, the new transition extent and transition extent deadline are selected such that the user stream will be migrated at the new transition extent deadline. In this manner, the source server module adapts the migration method to differences within data structures between the source and destination server modules. Such differences may occur due to, for example, different storage media, or similar storage media arranged in different configurations, of the primary storage devices within the various server modules. The method 400 then proceeds to step 426, where a query is made as to whether the transition extent deadline for the new transition extent has passed.

The above-described method 400 is described within the context of a source server module migrating a single user stream from a source server module to a destination server module. It will be appreciated by those skilled in the art that the above-described method 400 may be easily modified to migrate a plurality of streams for each user and, that the above described method may be repeated for each of a plurality of users presently served by a source server module.

Figure 5:
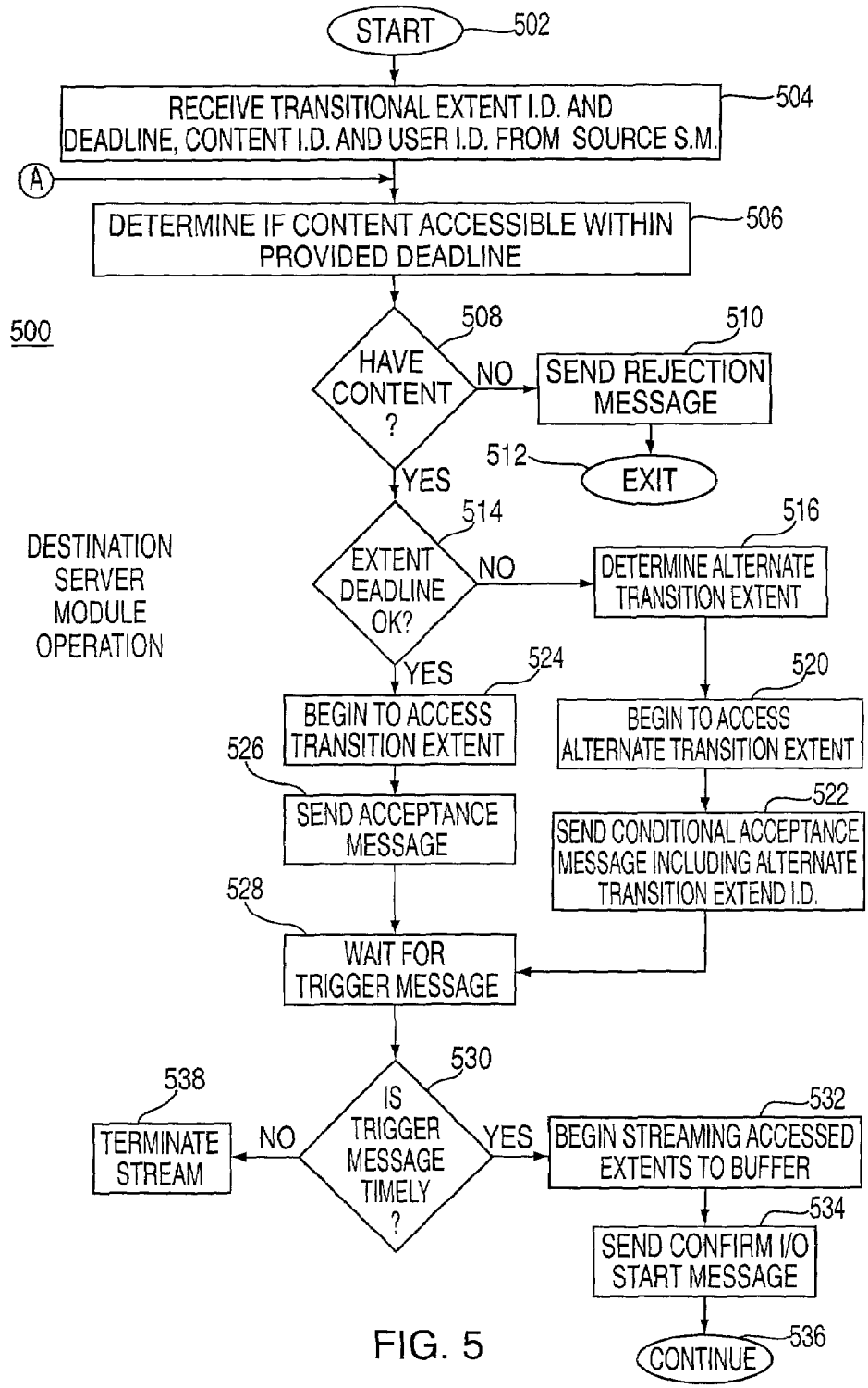
FIG. 5 depicts a flow diagram of a destination server user migration method suitable for use in the information server of FIG. 2.

FIG. 5 depicts a flow diagram of a method suitable for use in a destination server module. That is, FIG. 5 depicts a flow diagram of a method 500 suitable for use in a server module 220 operating as a destination server module in the case of a user being migrated from a source server module to the destination server module.

The method 500 is entered at step 502 and proceeds to step 504. At step 504, the destination server module receives a transitional extent identifier and deadline, a content identifier and a user identifier from a source server module. The transitional extent comprises the first extent to be accessed from the disk array associated with the destination server module, the transitional extent deadline comprises the time limit within which such access must occur, the content identifier defines the stream or streams being provided to the user identified via the user identification. The method 500 then proceeds to step 506.

At step 506, a determination is made if the content identified at step 504 is accessible within the provided deadline. The content may not be accessible, because the content may not be stored on the disk array associated with the destination server module. Additionally, the content, though available within the disk array, may not be retrievable within the transitional extent deadline. Additional factors (such as disk congestion on a disk array) may also lead to a determination that the content is not accessible within the provided deadline. The method 500 then proceeds to step 508.

At step 508, a query is made as to whether the content being streamed to the user has been determined to be available. If the query at step 508 is answered negatively, then the method 500 proceeds to step 510 where a rejection message is sent to the source server module (illustratively server module 220₁). The method 500 then proceeds to step 512 where it is exited. If the query at step 508 is answered affirmatively, then the method 500 proceeds to step 514.

At step 514, a query is made as to whether the transitional extent deadline has been determined to be acceptable. That is, a query is made as to whether the determination at step 506 indicates that the content may be retrieved from the associated disk array within the time frame defined by the transitional extent deadline. If the query at step 514 is answered negatively (unable to retrieve transitional extent before transitional extent deadline), then the method 500 proceeds to step 516. If the query at step 514 is answered affirmatively (able to retrieve transitional extent before transitional extent deadline), then the method 500 proceeds to step 524.

At step 524, the destination server module begins to access the transitional extent. That is, the disk array 110 associated with the destination server module 220 is used to access the transitional extent from the disk (disk 1 through disk I) storing the transitional extent. The method 500 then proceeds to step 526.

At step 526, an acceptance message is sent to the source server module. That is, at step 526 a message is sent to the source server module indicating that the destination server module will provide, in the output buffer of the destination server module, the transitional extent prior to the transitional extent deadline. The method 500 then proceeds to step 528.

At step 516, an alternate transitional extent is determined by the destination server module. That is, the destination server module (illustratively server module 220₃) determines the extent within the content stream presently being provided to the user that may be accessed prior to its respective extent deadline. In the absence of selecting a transitional extent providing a seamless transition the ideal alternate transitional extent is one in which a small amount of content is duplicated for the user rather than one in which some content is lost. In this manner, a user will not feel compelled to rewind slightly so that missing content is retrieved.

At step 518, a modified acceptance message is sent to the source server module. That is, at step 518 the destination server module informs the source server module that migration of the user to the destination server module is possible, but that such migration must occur during the transitional extent defined at step 516, rather than during the transitional extent originally defined by the source server module (i.e., at step 410 of the method 400 of FIG. 4). The method 500 then proceeds to step 520.

At step 520, the destination server module causes its associated disk array to begin to access the alternate transitional extent. That is, the disk scheduling program causes the access of the alternate transition extent to be put within the disk access schedule such that the alternate transition extent is retrieved from the appropriate disk within the disk array and stored within the buffer 225 associated with the destination server module 220 prior to the deadline associated with the alternate transition extent. The method 500 then proceeds to step 522.

At step 522, a conditional acceptance message including the alternate transition extent identification is sent to the source server module. The method 500 then proceeds to step 528.

At step 528, the method 500 waits for a trigger message to be received from the source server module. That is, the source server module, having received either an acceptance message transmitted at step 526 or a conditional acceptance message transmitted at step 522, responsively sends or refrains from sending a trigger message intended to cause the destination server module to begin migrating the user defined at step 504. The method 500 then proceeds to step 530.

At step 530, a query is made as to whether the trigger message received at step 528 is timely. That is, a query is made as to whether the trigger message received at step 528 is received prior to or after the extent deadline of the transition extent to be used. If the trigger message has been received in a timely manner, then the method 500 proceeds to step 532. If the trigger message has not been received in a timely manner, then the method 500 proceeds to step 538, where the stream is terminated.

At step 532, the destination server module begins streaming the access extents to the buffer such that the output buffer of the destination server module includes at least the transitional extent associated with the user to be migrated. The method 500 then proceeds to step 534.

At step 534, the destination server module sends a confirmation input/output (I/O) start message to the source server module. That is, at step 534 the destination server module confirms that the transition extent has been retrieved from the disk array and is stored (or will be stored) prior to the deadline associated with that transitional extent. The method 500 then proceeds to step 536, where the processing of extents for the user now migrated is continued.

The above-described method 500 is described within the context of migrating a single user and a stream being provided to that user to a destination server module. It will be appreciated by those skilled in the art that the above routine may be modified to transition a plurality of streams associated with the single user (by repeating the method for each of the streams to be migrated), and for migrating a plurality of users to the destination server module (by repeating the method for each of the plurality of users to be migrated).

Thus, the operation of a source server module as described in FIG. 4 in conjunction with the operation of a destination server module as described in FIG. 5 implements user migration between server modules forming an information server such that there is little or no degradation in the quality of presentation of the streams associated with the user being migrated. In this manner, the information server 125 of the interactive information distribution system 100 of FIG. 1 may continue to provide content streams to each of a plurality of users even in the case of degradations to server modules 220 forming the information server 125.

Figure 6:
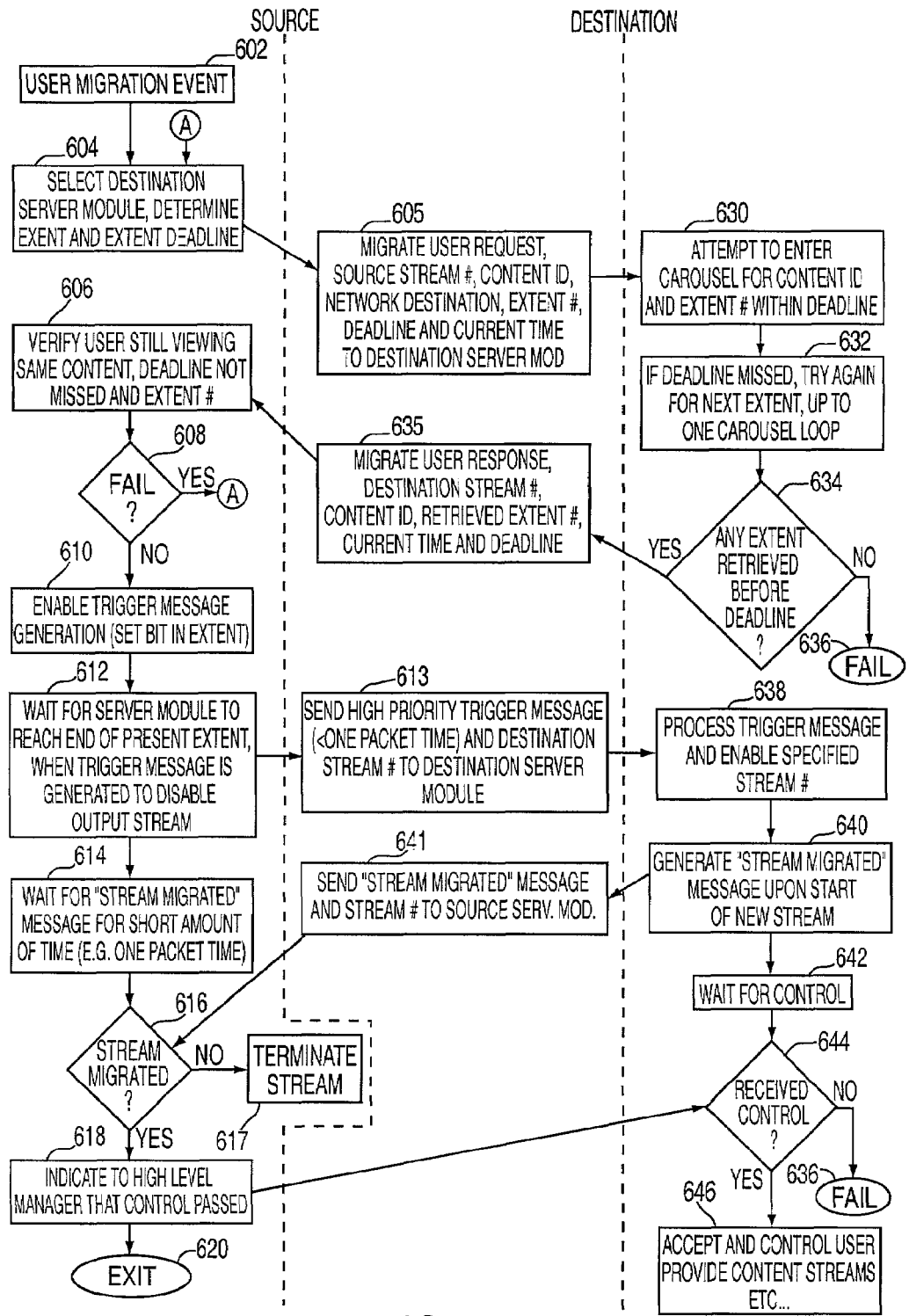
FIG. 6 depicts a flow diagram of a user migration method suitable for use in the information server of FIG. 2.

FIG. 6 depicts a flow diagram of a user migration method suitable for use in the information server of FIG. 2. Specifically, FIG. 6 depicts a flow diagram illustrating interactions between a source server and a destination server in effecting a user migration.

The method 600 is entered at step 602 when a user migration event occurs. As previously discussed, a user migration event may comprise a determination that a server load imbalance exists, a failure has occurred or is likely to occur and/or other events. The method 600 then proceeds to step 604.

At step 604, a destination server module is selected and a determination is made of the current extent being accessed and a transitional extent deadline. The method 600 then proceeds to step 605.

At step 605, a "migrate user" request, a source stream number, a content identifier, a network destination, an extent number, an extent deadline and a current time are transmitted from the source server to the destination server module. The method 600 then proceeds to step 630.

At step 630, an attempt is made by the destination server to enter the "carousel" (i.e., retrieve data from an extent of a disk drive within the disk array) for the identified content and extent number within the extent deadline. At step 632, if the destination server module failed to enter the carousel prior to the extent deadline, then the destination server module tries again to retrieve the next extent. This attempt is repeated for up to one carousel loop (e.g., the time it takes to read a single extent from each disk drive within an array of disk drives forming the carousel).

At step 634, a determination is made as to whether any extent was retrieved before the extent deadline. If the query at step 634 is answered negatively, then the method 600 fails at step 636. If the query at step 634 is answered affirmatively, then the method 600 proceeds to step 635.

At step 635, a migrate user response, a destination stream number, content identifier, retrieved extent number, current time and extent deadline messages are propagated from the destination server module to the source server module. The method 600 then proceeds to step 606.

At step 606, the source server module receives the communication of step 635 and verifies that the user is still viewing the same content, that the deadline has not been missed, and that the retrieved extent number has not passed. Alternatively, in one embodiment of the invention it is allowed for the retrieved extent number to have passed. In this embodiment of the invention, the user, when migrated, will review some content previously presented to the user. However, such repeated presentation of content to the user is preferable to a loss of content. The method 600 then proceeds to step 608.

At step 608, a determination is made by the server module as to whether the conditions of step 606 have been successfully verified. If the query at step 608 indicates that verification has failed, then the method 600 proceeds to step 604. If the query at step 608 indicates that the verification has not failed, then the method 600 proceeds to step 610.

At step 610, a trigger message generation is enabled (e.g., a bit is set in the appropriate extent), and the method 600 proceeds to step 612.

At step 612, the source server module waits until the end of the present extent is reached, at which time the trigger message is generated and the output stream is disabled. That is, at step 613, the high priority trigger message (i.e., less than one packet time) is sent to the destination server module, along with the destination stream number. The source module processor contemporaneously proceeds to step 614 while the destination server module processor proceeds to step 638.

At step 638, the trigger message is processed and the specified stream number is enabled. The method 600 then proceeds to step 640.

At step 640, a "stream migrated" message is generated on the start of the new stream. That is, at step 640, the destination server module begins streaming the identified stream number (from step 613) and responsively generates a message indicative of the start of the new stream. At step 641, a "stream migrated" message and indication of stream number is sent to the source server module. Contemporaneously, the destination server module processor proceeds to step 642 to wait for the passing of control of the user to be migrated from the source server module to the destination server module.

After sending the trigger message to the destination server module (at step 612), the source server module waits at step 614 for reception of a "stream migrated" message for a predefined, relatively short, period of time. In the exemplary embodiment, the amount of time waited is equal to one or a few packet time periods (i.e., the amount of time required to transmit a packet via the forward application transport channel). The method 600 then proceeds to step 616.

At step 616, a query is made as to whether the stream migrated message has been received within the waiting time defined at step 614. If the stream migration method has not been received prior to the expiration of the short waiting time, then the method 600 proceeds to step 617 where the stream is terminated. If the stream migrated message has been timely received, then at step 618 the source server module indicates to a high level manager, such as a server system manager, that control of the user/stream has been passed from the source to the destination server module. It is noted that the high level manager will be apprised of the users served by each server upon initiation of a user session with a server.

After generating the "stream migrated" message at step 640, the destination server module waits for control to be passed for a predetermined amount of time at step 642. At step 644, a query is made as to whether the destination server module has in fact received a control transfer indicative message from the source control module. If the query at step 644 indicates that the control message was not timely received, then the method 600 proceeds to step 636 where it fails. If the query at step 644 indicates that a control message was timely received, then the method 600 proceeds to step 646 where control is accepted by the destination server module and a content stream is provided to the user. The destination server module continues to service the user.

It will be appreciated by those skilled in the art that while the invention has been primarily described in terms of extents, extent boundaries, transitional extents and the like, other means of describing locations within content streams may be used. For example, rather than utilizing extents, one embodiment of the invention utilizes a packet offset measure to define entry into, or exit out of, a content stream by the number of packets offset from a particular point within the content stream (e.g., from the beginning of the content stream). Thus, a source server module may provide to a destination server module a transitional packet offset, i.e., the offset number of a packet at which a transition is to occur. This modification is reflected in, for example, step 408 of FIG. 4 where a determination is made of the current extent being accessed is instead realized as a determination that is made of the offset of the current packet being accessed. When a packet offset is communicated to the destination server module, the destination server module may determine which extents on the destination server module include the packet defined by the packet offset.

Thus, all terminology related to extents, extent boundaries, transitional extents and the like are to be equivalently construed as offset packet, offset packet boundary, transitional offset packet and the like. In this manner, differences between extent sizes of the source server module and destination server module may be transparently addressed such that appropriate transitions are made, thereby migrating users in a substantially seamless manner. Moreover, in the case of an adaptation header of a packet (e.g., an MPEG2 packet) including a discontinuity indicator, such an indicator may be used to indicate an appropriate packet for use and an entry or exit packet in a content stream.

Although various embodiments which incorporate the teachings of the present invention have been shown and described in detail herein, those skilled in the art can readily devise many other varied embodiments that still incorporate these teachings.

What is claimed is:

1. A method for performing user migrating comprising:
   for a content stream being provided to a user from a source server module, determining a transitional extent deadline associated with a transitional extent that defines an appropriate first extent to be provided to said user via a destination server module, said content stream being divided into a plurality of extents, including said transitional extent, said appropriate first extent, and a plurality of subsequent extents;
   determining whether said destination server module is capable of retrieving said transitional extent from an array of storage devices within the transitional extent deadline; and
   causing said destination server module to provide said transitional extent and said subsequent extents to said user, each extent containing an amount of information retrieved from a single storage device of the array of storage devices during one service period.

2. The method of claim 1, wherein determining whether said destination server module is capable of providing said transitional extent to said user within said transitional extent deadline includes:
   communicating at least said transitional extent including said transitional extent deadline to said destination server; and
   evaluating a message received from said destination server module, said message comprising one of a rejection, an acceptance and a modified acceptance of a migration of said user to said destination server module.

3. The method of claim 2, wherein said message is the rejection of said migration of said user to said destination server module, and further comprising selecting an alternate destination server module.

4. The method of claim 2, wherein said message is the acceptance, and further comprising:
   determining whether said transitional extent deadline has passed; and
   when said transitional extent deadline has passed, determining a next transitional extent for said content stream being provided to said user.

5. The method of claim 4, further comprising:
   in response to said transitional extent deadline not having passed, stopping an output and sending a trigger message to said destination server module.

6. The method of claim 5, further comprising:
   waiting for a response message from said destination server module; and
   in response to an error indicative response message, selecting an alternative destination server module.

7. The method of claim 2, wherein said message is said modified acceptance, and further comprising:
   selecting a new transitional extent when said modified acceptance is appropriate; and
   selecting an alternative destination server module when said modified acceptance is inappropriate.

8. The method of claim 3, wherein an alternate extent is selected to cause a repetition in content preparation.

9. The method of claim 1, wherein said transitional extent is entered at an extent boundary.

10. The method of claim 9, wherein said transitional extent is entered at a packet including an asserted discontinuity flag.

11. The method of claim 9, wherein said transitional extent is determined with respect to a packet offset parameter comprising an asserted discontinuity flag in a header portion of said packet.

12. The method of claim 1, wherein said transitional extent is determined with respect to a packet offset parameter.

13. A method for user migration, comprising:

receiving a transitional extent identifier, transitional extent deadline and a content stream identifier associated with a migrated user of a content stream, said content stream being divided into a plurality of extents, each extent containing an amount of information retrieved from a single storage device of an array of storage devices during one service period;

determining whether an identified transitional extent, which is identified by said transitional extent identifier, of an identified content stream, which is identified by said content stream identifier, may be accessed prior to said transitional extent deadline; and in response to a favorable determination, accessing said identified transitional extent and providing a message indicative of acceptance of said migrated user.

14. The method of claim 13, further comprising:

in response to an unfavorable determination, communicating an alternate transitional extent identifier to a source server module; and accessing said identified content stream beginning with said identified alternate transitional extent.

15. An apparatus, comprising:

a plurality of server modules including a first server module and a second server module, each server module having a mass storage device for storing content as respective sequences of a plurality of extents including a transitional extent and a first extent, each extent containing an amount of information retrieved from a single storage device of said mass storage device during one service period; and a switch for coupling a plurality of content streams provided by said server modules to a plurality of transport processors, said content streams including at least one first content stream;

wherein said at least one first content stream being provided to a user by said first server module is caused to be provided to said user by said second server module, an initial portion of said first content stream being defined by a transition, said first and second server modules cooperating to define said transitional extent representing said first extent of said first content stream and a transitional extent deadline such that said transitional extent is retrieved from said mass storage device within said transitional extent deadline;

wherein, in response to a migration event, at least one content stream is provided by a source server module and a failing server module is migrated to a non-failing server module such that a plurality of subscribers receiving at least one content stream receive substantially uninterrupted service.

16. The apparatus of claim 15, wherein in response to a failure, an over utilization or a load imbalance condition, at least a portion of said at least one content streams provided by said failing server module is migrated to a non-over utilized server module such that said subscribers receiving said at least one content streams receive substantially uninterrupted service.

17. The apparatus of claim 16, wherein said mass storage device comprises an array of storage devices for storing said content in a striped manner, said content being distributed among said array of storage devices according to a sequence of extents.

* * * * *

UNITED STATES PATENT AND TRADEMARK OFFICE
CERTIFICATE OF CORRECTION

| | | |
|---|---|---|
| PATENT NO. | : 7.072,972 B2 | |
| APPLICATION NO. | : 09/733808 | |
| DATED | : July 4, 2006 | |
| INVENTOR(S) | : Danny Chin et al. | |

It is certified that error appears in the above-identified patent and that said Letters Patent is hereby corrected as shown below:

In the drawings, sheet 4 of 6, FIG. 4, in box "418," delete "ACCEPTACE" and insert instead --ACCEPTANCE--.

In the drawings, sheet 6 of 6, FIG. 6, in box "604," delete "EXENT" and insert --EXTENT--.

In column 5, lines 5-9, delete "A method and apparatus for …in its entirety." And insert the same on line 6 as a new paragraph.

In column 5, line 6, delete "in." and insert instead --in,--.

In column 15, line 65, delete "migrating" and insert instead --migrating,--.

In column 18, lines 21 and 24, delete" streams" and insert instead --stream--.

Signed and Sealed this

Fifth day of September, 2006

JON W. DUDAS
*Director of the United States Patent and Trademark Office*